United States Patent
Kuwano et al.

(10) Patent No.: US 6,670,782 B2
(45) Date of Patent: Dec. 30, 2003

(54) STEPPING MOTOR DRIVER

(75) Inventors: Yoshifumi Kuwano, Kiryu (JP); Yukinari Takahashi, Kiryu (JP); Akio Takemori, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/336,000

(22) Filed: Jan. 3, 2003

(65) Prior Publication Data

US 2003/0137272 A1 Jul. 24, 2003

(30) Foreign Application Priority Data

Jan. 23, 2002 (JP) ........................................ 2002-013584

(51) Int. Cl.[7] ................................................ H02P 8/00
(52) U.S. Cl. ........................ 318/685; 318/800; 318/813
(58) Field of Search ................................ 318/685, 727, 318/801, 802, 807, 811, 813, 799, 800, 798, 808

(56) References Cited

U.S. PATENT DOCUMENTS

| | | | | | |
|---|---|---|---|---|---|
| 4,443,746 A | * | 4/1984 | Araki | ........................ | 318/685 |
| 4,629,961 A | * | 12/1986 | Blaschke | .................... | 318/803 |
| 5,225,756 A | * | 7/1993 | Coutu | ........................ | 318/685 |
| 5,309,353 A | * | 5/1994 | Schauder et al. | ........... | 318/798 |
| 5,668,459 A | * | 9/1997 | Kim | ............................ | 318/798 |
| 5,903,129 A | * | 5/1999 | Okuno et al. | ................ | 318/721 |
| 5,963,007 A | * | 10/1999 | Toyozawa et al. | .......... | 318/799 |
| 6,075,337 A | * | 6/2000 | Ishii et al. | .................... | 318/801 |
| 6,259,226 B1 | * | 7/2001 | Kaitani et al. | ................ | 318/798 |
| 6,320,349 B1 | * | 11/2001 | Kaneko et al. | ............. | 318/798 |
| 6,377,017 B2 | * | 4/2002 | Kondou et al. | ............. | 318/813 |
| 6,377,018 B2 | * | 4/2002 | Tajima et al. | ................ | 318/807 |

FOREIGN PATENT DOCUMENTS

| | | | | | |
|---|---|---|---|---|---|
| JP | 02136100 A | * | 5/1990 | ............. | H02P/8/00 |
| JP | 03135388 A | * | 6/1991 | ........... | H02P/5/408 |
| JP | 6-225595 A | | 8/1994 | | |

* cited by examiner

*Primary Examiner*—Robert E. Nappi
*Assistant Examiner*—Eduardo Colon-Santana
(74) *Attorney, Agent, or Firm*—Birch, Stewart, Kolasch & Birch, LLP (57) ABSTRACT

A stepping motor driver having current sensors that detect winding current values, an angle detection device that detects a rotational angle of a rotor, a first coordinate transformation device that transforms winding current values in a rotational coordinate system, an angle calculation device that calculates a command angle value. A third coordinate transformation device transforms the command current values in the rotational coordinate system according to the difference between the command angle value and the rotor angle value, a current control device that generates current control signals in the rotational coordinate system based on the differences between the command current values in the rotational coordinate system and the winding current values in the rotational coordinate system. A second coordinate transformation device transforms the current control signals in the rotational coordinate system into current control signals in a fixed coordinate system, and a current supply device that supplies currents to windings of the stepping motor.

2 Claims, 5 Drawing Sheets

STEPPING MOTOR DRIVER

This nonprovisional application claims priority under 35 U.S.C. §119(a) on patent application Ser. No. 2002-013584 filed in JAPAN on Jan. 23, 2002, which is herein incorporated by reference.

BACKGROUND OF THE INVENTION

1. Field of the Invention

The present invention concerns a stepping motor driver for controlling rotational angular position and rotational speed of a rotor of a stepping motor.

2. Description of the Prior Art

With the high functionalization of systems equipped with motors, motors of which noise levels and vibration levels are low, and of which rotational speed ranges are wide, are being demanded. A stepping motor has excellent properties such as a small rotational angular position error and a wide rotational speed range. However, the stepping motor is caused to make a stepping rotation by changing instantaneously an excitation current for windings at each time when an external command pulse is given. Accordingly, there have been problems that the stepping motor causes vibration and noise and that it tends to step out when the excitation current is changed.

To solve such problems, a micro-step excitation system in which an inverter of a PWM (pulse width modulation) type is used to smoothly change the excitation current for windings is being generally used.

In the micro-step excitation system being used in general, a current of a sinusoidal wave form is divided to form stepped currents having different levels, and the stepped currents are fed to the respective motor windings, with phase differences between them according to the number of phases of the motor. Accordingly, it is necessary to control phase currents according to the number of phases of the motor. So, the construction of the driver becomes complicated with the increase of the number of phases of the motor.

To simplify the construction of the driver, it is conceived to apply an inverter controller technique that is generally used for controlling an AC servomotor, and in which rotational coordinate system is introduced, to the stepping motor driver.

The stepping motor driver to which the inverter controller technique is applied is suitable for realizing a micro step drive of the motor at a high resolution, since a rotational angle can be controlled directly.

As an example of such stepping motor driver, there is a stepping motor controller disclosed in Unexamined Japanese Patent Publication No.6-225595. In this driver, each phase current in a fixed coordinate system is converted into a phase current in a d-q rotational coordinate system in which d-axis is in a direction of a magnetic flux of a rotor and q-axis is in a direction perpendicular to the d-axis, and the control of the currents are dealt with in the rotational coordinate system. An encoder is connected to a stepping motor, and closed loop control systems for current control, for velocity control and for position control are composed. Each information in the fixed coordinate system is transformed into information in the d-q rotational coordinate system to carry out the position control.

Taking a current in the d-axis direction to be an exciting current and a current in the q-axis direction to be a torque current, a command current in the q-axis is varied to generate a torque for rotating the rotor. The current is varied so as to make the current in the q-axis direction minimum when the rotational position of the rotor reaches a desired position.

To simplify the construction of the controller, a non-interference component is omitted and the command current is given directly on the d-axis or q-axis. In this controller, since the rotational position of the rotor of the motor is controlled so as to make a position detection signal coincide with a position command, a micro step drive of the stepping motor in accordance with the resolution of a position controller and that of a position detector is possible.

In the stepping motor controller disclosed in the Unexamined Japanese Patent Publication No.6-225595, the position detection signal of the rotor detected by the position detector is used for controlling rotational angular position of the rotor of the motor. That is, a current in the motor is transformed into a current in the d-q rotational coordinate system in which the d-axis is in a direction of the magnetic flux of the rotor and the q-axis is in a direction perpendicular to the d-axis, using the position detection signal detected by the position detector. The control in the stepping motor controller is a closed loop position control using the position detection signal detected by the position detector.

Further, a current perpendicular to the magnetic flux, that is, a current in the direction of the q-axis, is controlled according to a velocity deviation to control the torque to be generated. Accordingly, the position controller and a velocity controller are required to be provided to effectuate the position control.

Thus, there is a problem that the construction of the stepping motor controller such as disclosed in the Unexamined Japanese Patent Publication No.6-225595 is complicated, and consequently, expensive.

SUMMARY OF THE INVENTION

It is an object of the present invention to provide a stepping motor driver having a simple construction, low in price and having a micro step drive function with high degree of accuracy.

In order to achieve the above object, the present invention provides a stepping motor driver comprising;

current sensors that detect respective winding current values of corresponding phases of a stepping motor that is caused to make a stepping rotation at each time when an external command pulse is applied, an angle detection means that detects a rotor angle value indicative of a rotational angular position of a rotor, of the stepping motor, comprising a permanent magnet, a first coordinate transformation means that receives the winding current values from the current sensors, receives the rotor angle value from the angle detection means, and transforms the winding current values into winding current values in a rotational coordinate system, an angle calculation means that receives a command pulse train composed of the external command pulses and calculates a command angle value, a third coordinate transformation means that transforms command current values given from the outside into command current values in the rotational coordinate system according to the difference between the command angle value and the rotor angle value, a current control means that generates current control signals in the rotational coordinate system based on the differences between the command current values in the rotational coordinate system and the winding current values in the rotational coordinate system, a second coordinate transformation means that receives the current control signals in the rotational coordinate system from the current control means, receives the rotor angle value from the angle detection means, and transforms the current control signals in the rotational coordinate system into current control signals in a fixed coordinate system, and a current supply means that receives the current control signals in the fixed coordinate system from the second coordinate transformation means, and supplies currents to windings of respective phases of the stepping motor.

According to the present invention, it is possible to provide a stepping motor driver having a simple construction, low in price and having a micro step drive function with high degree of accuracy, since the winding current values are transformed into the values in the rotational coordinate system, the current control signals are generated based upon the differences between the command current values and the winding current values in the rotational coordinate system, the current control signals in the rotational coordinate system are transformed into the current control signals in the fixed coordinate system, and then fed to the current supply means.

DETAILED DESCRIPTION OF THE INVENTION

First, the principle of the present invention is explained.

Figure 1:
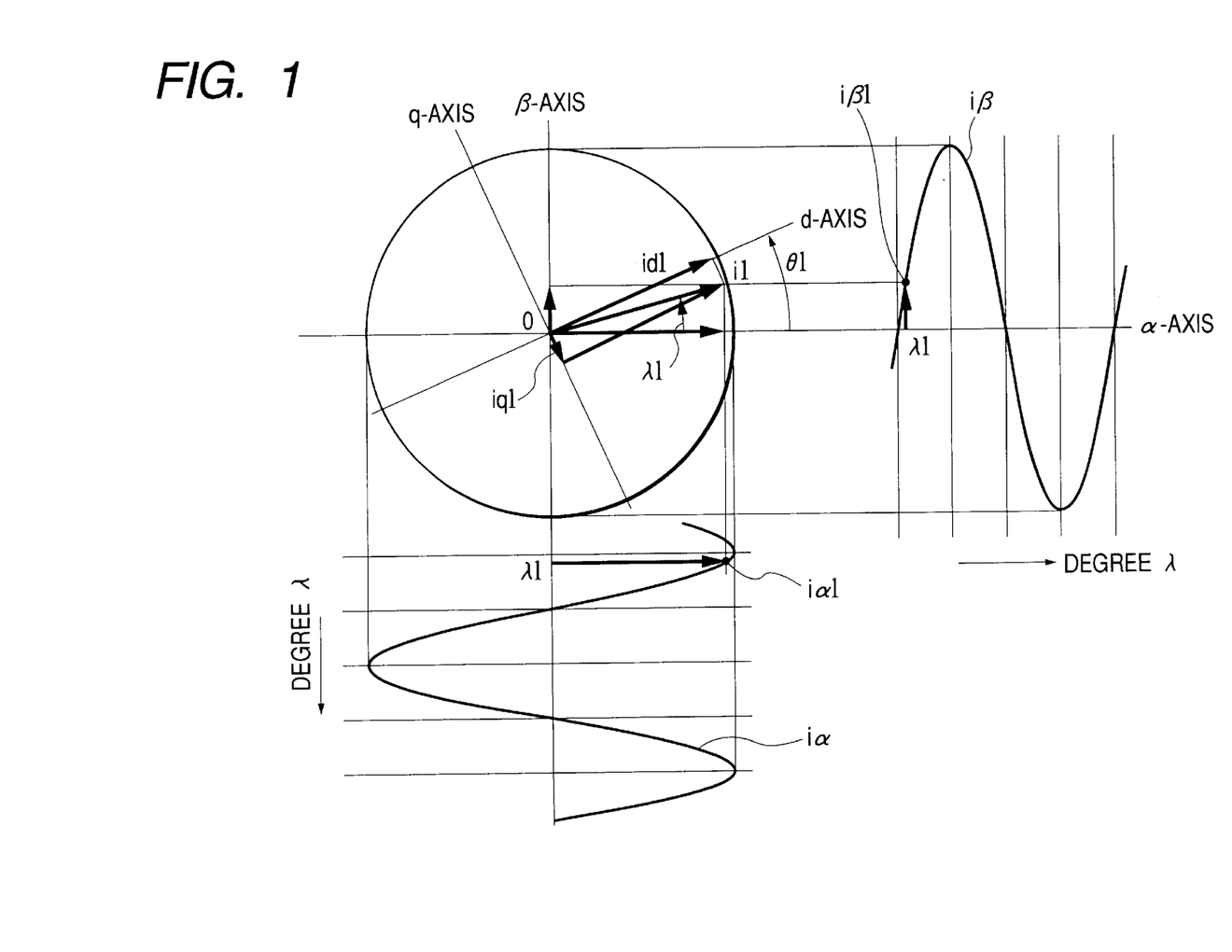
FIG. 1 is a diagram for illustrating the relation between a fixed coordinate system and a rotational coordinate system.

FIG. 1 is a vector diagram for illustrating the relation between a two-phase α-β fixed coordinate system and a d-q rotational coordinate system.

Referring to FIG. 1, a current iα and a current iβ both of sinusoidal wave forms and having a phase difference of 90° in electrical angle between them are fed to an A-phase motor winding and a B-phase motor winding respectively to carry out a micro step drive. Assuming that a value of the current iα is iα1 and a value of the current iβ is iβ1 at an angle λ=λ1, a resultant current vector i1 rotated by an angle λ=λ1 from the α-axis is obtained in the rotational coordinate system.

Now, an angle between the direction of the magnetic flux of the rotor and the α-axis is expressed by θ1. An axis of the rotational coordinate in the direction of the magnetic flux is expressed by a d-axis. Further, an axis of the rotational coordinate perpendicular to the d-axis is expressed by a q-axis. Then, the d-axis and the q-axis are in the directions rotated by the angle θ1 from the α-axis and the β-axis, respectively. The components of the resultant current vector i1 in the d-q rotational coordinate system are a current id1 and a current iq1 that are obtained by projecting the resultant current vector i1 on the d-axis and on the q-axis, respectively.

As commonly known, a motor torque is caused by a vector product of a magnetic flux and a current. Accordingly, if the current iq perpendicular to the magnetic flux has a value not zero, then the motor has a rotational force. Therefore, if the direction of the resultant current vector i1 does not coincide with the d-axis as shown in FIG. 1, then a q-axis component of the resultant current vector i1 appears and a torque is generated in the motor.

Figure 2:
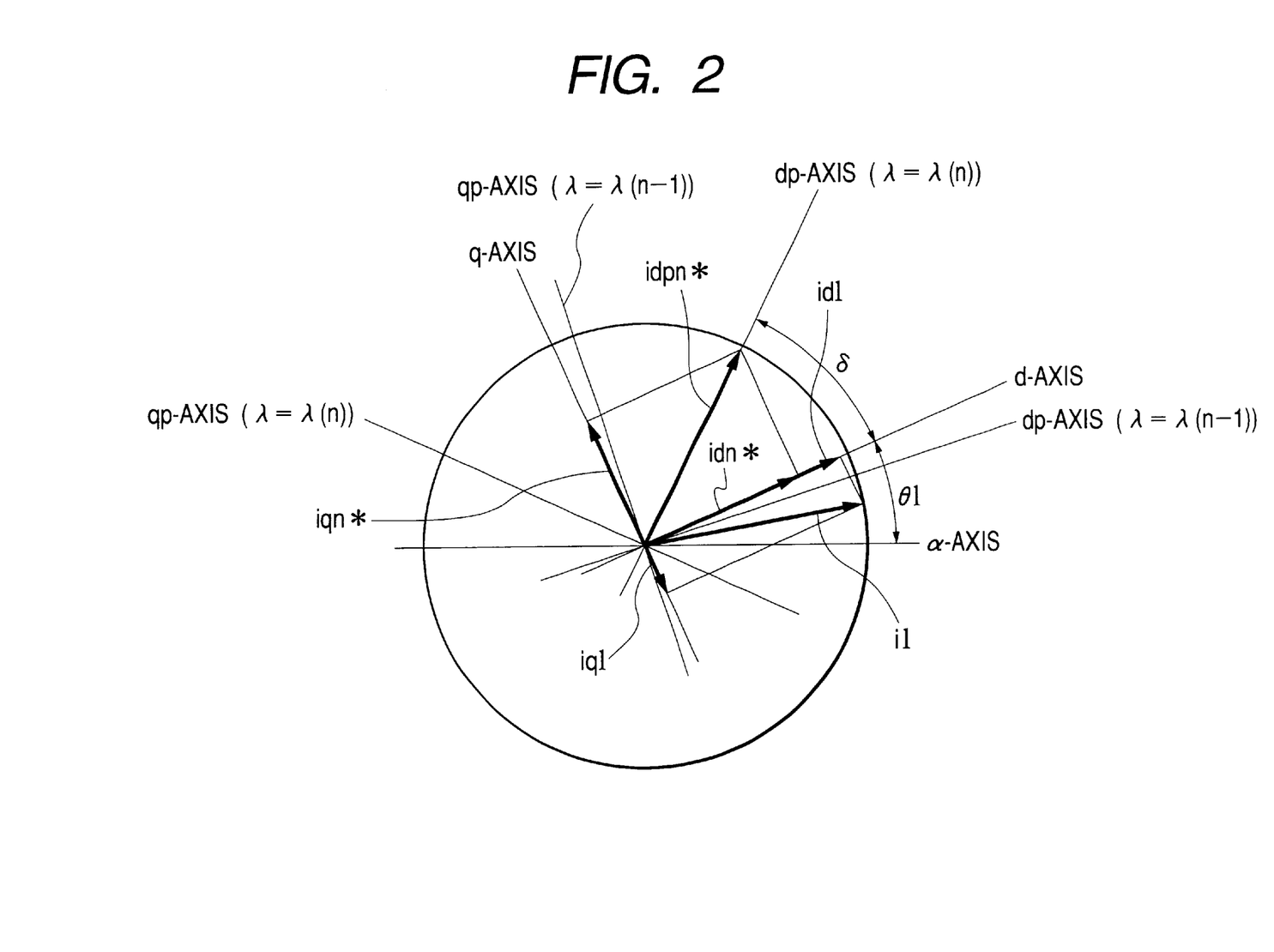
FIG. 2 is a diagram for illustrating the relation between a dp-qp rotational coordinate system and a d-q rotational coordinate system.

FIG. 2 is a vector diagram for illustrating the relation between a dp-qp rotational coordinate system and the d-q rotational coordinate system, for explaining the operation of the present invention. The d-axis and the q-axis in FIG. 2 are similar to those in FIG. 1.

An angle between the d-axis and the α-axis at a time (n−1) is assumed to be θ1. At a time n when a next command pulses are applied, an angle deviation δ that is a difference between a command angle and a detected angle increases since the command angle increases by command pulses given. That is, a command current is regarded to be given at a position rotated instantaneously by the angle deviation δ relative to the d-q axes.

Coordinate axes obtained by rotating the d-q axes by the angle deviation δ are expressed by a dp-qp axes. Assuming that an amplitude of the command current value given on the dp-axis is idpn*, and that an amplitude of the command current value given on the dp-axis is zero, d-axis component idn* of idpn* and q-axis component iqn* of idpn* are given by equation (1) as follows.

$$\begin{bmatrix} idn^* \\ iqn^* \end{bmatrix} = \begin{bmatrix} \cos\delta & -\sin\delta \\ \sin\delta & \cos\delta \end{bmatrix} \begin{bmatrix} idpn^* \\ 0 \end{bmatrix} = \begin{bmatrix} idpn^* \cos\delta \\ idpn^* \sin\delta \end{bmatrix} \quad (1)$$

Accordingly, a torque is generated by the q-axis component iqn* of idpn*. Thus, angle difference between the dp-axis and the d-axis increases at each time when the command pulse is applied, the q-axis component of the command current on the dp-axis appears, the torque increases, and the rotor of the motor is rotated. By controlling the command current value to coincide with a detected current value, the rotor of the motor is stopped with a declination at which the torque balances with load. Thus, the motor is caused to make a stepping rotation at each time when the command pulse is applied.

In this method, the dp-axis component of the motor command current is set to be a value corresponding to an amplitude of the command current of the motor, and the qp-axis component of the motor command current is set to be zero. However, the torque is caused by the q-axis component of the command current caused by the angle difference between the rotor angle θ1 and the command angle θ1+δ. Accordingly, it is not necessary to control the q-axis component of the current in accordance with the rotor angle or the generated torque. That is, for example, a transformation operation to transform command current values of sinusoidal wave forms given on α-β axes in α-β fixed coordinate system into the d-q rotational coordinate system can be omitted.

Current signals iα,iβ in the α-β fixed coordinate system can be transformed into current signals id,iq in the d-q rotational coordinate system by an equation (2) as follows;

$$\begin{bmatrix} id \\ iq \end{bmatrix} = \begin{bmatrix} \cos\theta & \sin\theta \\ -\sin\theta & \cos\theta \end{bmatrix} \begin{bmatrix} i\alpha \\ i\beta \end{bmatrix} \quad (2)$$

where, $\theta$ is an angle between the $\alpha$-axis of the $\alpha$-$\beta$ fixed coordinate system and the d-axis of the d-q rotational coordinate system.

Similarly, current signals vd,vq in the d-q rotational coordinate system can be transformed into current signals v$\alpha$,v$\beta$ in the $\alpha$-$\beta$ fixed coordinate system by an equation (3) as follows;

$$\begin{bmatrix} v\alpha \\ v\beta \end{bmatrix} = \begin{bmatrix} \cos\theta & -\sin\theta \\ \sin\theta & \cos\theta \end{bmatrix} \begin{bmatrix} vd \\ vq \end{bmatrix} \quad (3)$$

Above explanation is made for a two-phase stepping motor as an example. For a three-phase stepping motor, three-phase current signals iu,iv,iw are transformed into current signals i$\alpha$,i$\beta$ in two-phase fixed coordinate system by an equation (4) as follows;

$$\begin{bmatrix} i\alpha \\ i\beta \end{bmatrix} = \sqrt{2/3} \begin{bmatrix} 1 & -1/2 & -1/2 \\ 0 & \sqrt{3}/2 & -\sqrt{3}/2 \end{bmatrix} \begin{bmatrix} iu \\ iv \\ iw \end{bmatrix} \quad (4)$$

Then, control similar to the case of the two-phase stepping motor is conducted, then output signals vd,vq in the d-q rotational coordinate system are transformed into v$\alpha$,v$\beta$ in the $\alpha$-$\beta$ fixed coordinate system, and then the output signals v$\alpha$,v$\beta$ are further transformed into output signals vu,vv,vw for a three-phase current control means using an equation (5) as follows;

$$\begin{bmatrix} vu \\ vv \\ vw \end{bmatrix} = \sqrt{2/3} \begin{bmatrix} 1 & 0 \\ -1/2 & \sqrt{3}/2 \\ -1/2 & -\sqrt{3}/2 \end{bmatrix} \begin{bmatrix} v\alpha \\ v\beta \end{bmatrix} \quad (5)$$

Additionally, equations (4) and (5) are transformation equations for cases in which $\alpha$-axis is in phase with U-axis. In case that $\alpha$-axis is in phase with an axis other than U-axis, definition of the direction is appropriately modified according to the corresponding phase.

Further, in a micro step drive for a stepping motor of more phases, similar control can also be made by performing coordinate transformation in accordance with the number of phases.

Figure 3:
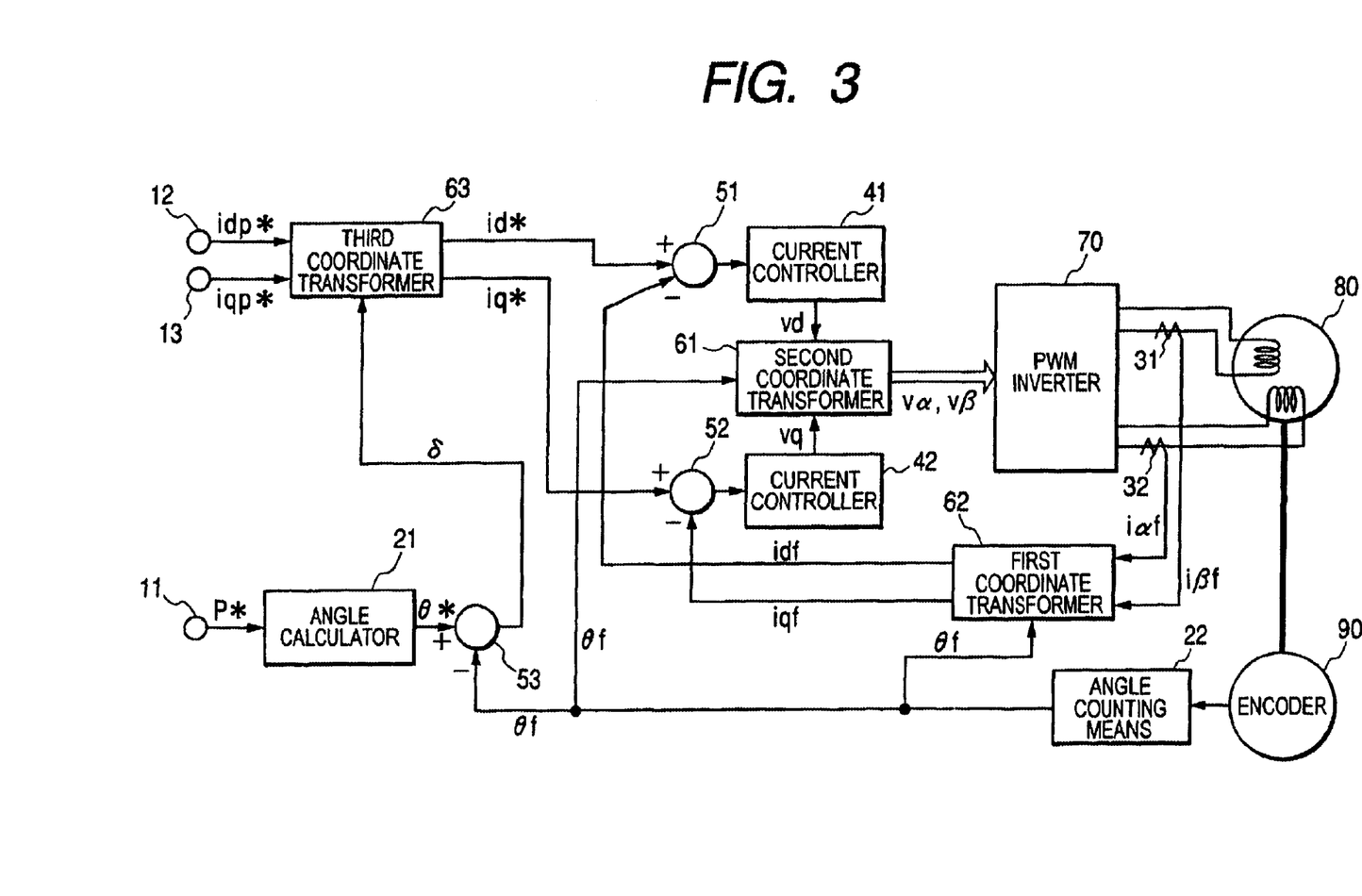
FIG. 3 is a block diagram for illustrating the first embodiment of the stepping motor driver according to the present invention.

FIG. 3 is a block diagram for illustrating the first embodiment of the stepping motor driver according to the present invention.

A two-phase stepping motor 80 comprises a rotor (not shown in the figure) comprising a permanent magnet. The stepping motor 80 is caused to make a stepping rotation at each time when an external command pulse is applied, being supplied a current from a PWM inverter 70 that is a current supply means.

Current sensors 31,32 detect respective winding current values i$\alpha$f,i$\beta$f of the motor and transmit them into a first coordinate transformer 62 that is a first coordinate transformation means.

An angle detection means comprises an angle counting means 22 and an encoder 90 connected to the stepping motor 80, and detects rotor angle value $\theta$f indicating a rotational angular position of the rotor.

The first coordinate transformer 62 receives the winding current values i $\alpha$f, i$\beta$f from the current sensors 31,32, and transforms the winding current values i$\alpha$f,i$\beta$f into winding current values idf,iqf in a rotational coordinate system using the rotor angle value $\theta$f, transmitted from the angle counting means 22, as the rotational angle for the coordinate transformation.

On the other hand, a command pulse train P* composed of external command pulses is applied to a command pulse input terminal 11.

An angle calculator 21 that is an angle calculation means receives the command pulse train P* and calculates a command angle value $\theta$* that will be explained later.

A comparator 53 that is a comparator means compares the command angle value $\theta$* received from the angle calculator 21 with the rotor angle value $\theta$f received from the angle counting means 22. The difference between the command angle value $\theta$* and the rotor angle value $\theta$f is transmitted to a third coordinate transformer 63 that is a third coordinate transformation means as the angle deviation value $\delta$.

On the other hand, a command current value idp* is applied to a dp-axis command current input terminal 12 and another command current value iqp* is applied to a qp-axis command current input terminal 13. Here, the command current value idp* is set to be a value corresponds to an amplitude of a command current for the motor and another command current value iqp* is set to be zero.

The third coordinate transformer 63 transforms the command current value idp* and the command current value iqp* into values in the d-q rotational coordinate system, using the angle deviation value $\delta$ received from the comparator 53 as the rotational angle for the coordinate transformation, and transmits a command current value id* on the d-axis and a command current value iq* on the q-axis.

A comparator 51 that is a comparator means compares the command current value id* on the d-axis with the winding current value idf that is a value of the d-axis component of the winding current value. The difference between the command current value id* and the winding current value idf is transmitted to a current controller 41 as a current error value. The current error value is amplified in the current controller 41, then transmitted to a second coordinate transformer 61 that is a second coordinate transformation means as a current control signal vd in the d-q rotational coordinate system.

A comparator 52 that is also a comparator means compares the command current value iq* on the q-axis with the winding current value iqf that is a value of the q-axis component of the winding current value. The difference between the command current value iq* and the winding current value iqf is transmitted to a current controller 42 as another current error value. This current error value is amplified in the current controller 42, then transmitted to a second coordinate transformer 61 that is a second coordinate transformation means as a current control signal vq in the d-q rotational coordinate system.

Additionally, the current controller 41 and the current controller 42 constitute a current control means.

The current control signals vd,vq are transformed into current control signals v$\alpha$, v$\beta$ in a $\alpha$-$\beta$ fixed coordinate system by the second coordinate transformer 61, and then transmitted into the PWM inverter 70. The rotor angle value $\theta$f identical with the one used in the first coordinate transformer 62 is used as the angle between the $\alpha$-axis and the d-axis in the transformation from the d-q rotational coordinate system into the $\alpha$-$\beta$ fixed coordinate system.

Figure 4:
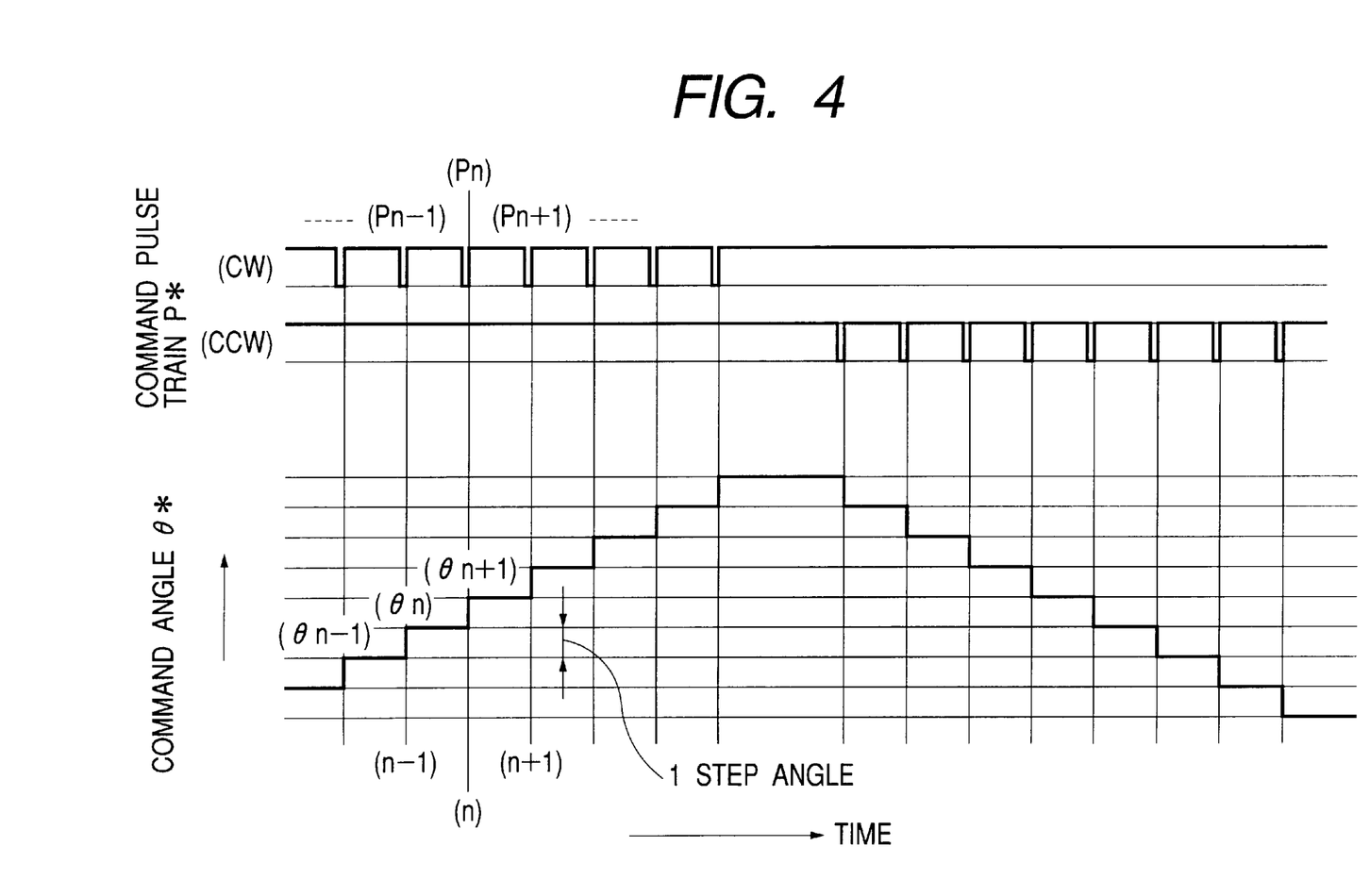
FIG. 4 is a diagram for illustrating the relation between command pulse train and command angle.

FIG. 4 is a diagram for illustrating a function of the angle calculator 21. The angle calculator 21 can be composed of an up-down counter for an example. At the start, positional relation between the α-β fixed coordinate system and the d-q rotational coordinate system is adjusted appropriately, then the command angle value θ* is calculated by conducting adding or subtracting calculation at each time when the command pulse P* in CW or CCW direction is put in.

Figure 5:
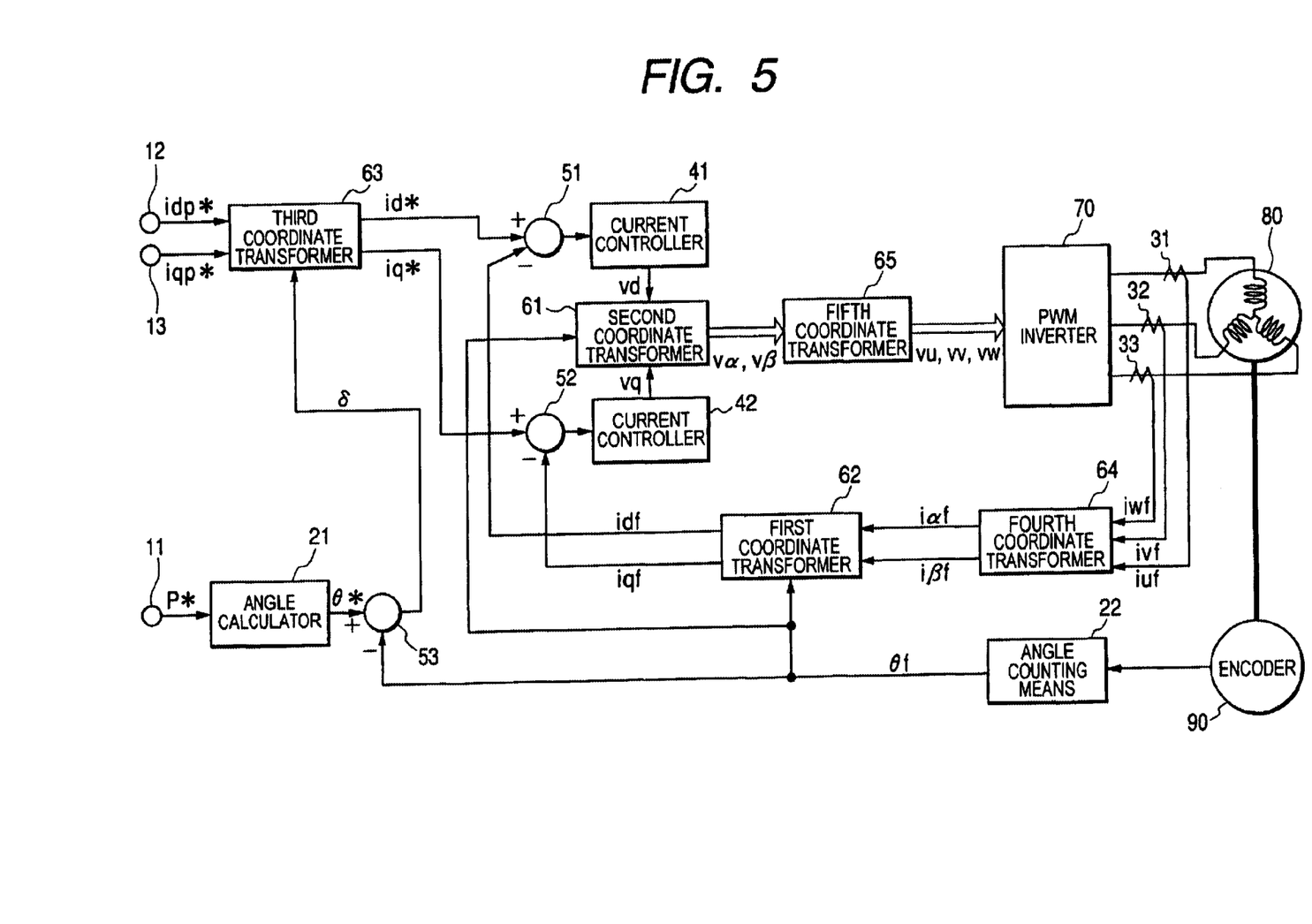
FIG. 5 is a block diagram for illustrating the second embodiment of the stepping motor driver according to the present invention.

FIG. 5 is a block diagram for illustrating the second embodiment of the stepping motor driver according to the present invention.

In this embodiment, stepping motor to be controlled is a three-phase stepping motor, differing from the first embodiment in which the motor to be controlled is the two-phase stepping motor. In the drawing, the same numerals are affixed to the composing elements having same or similar functions to those in FIG. 3.

The embodiment shown in FIG. 5 is same to that shown in FIG. 3 except that the stepping motor 80 to be controlled is the three-phase stepping motor, and that a fourth coordinate transformer 64 that is a fourth coordinate transformation means, a fifth coordinate transformer 65 that is a fifth coordinate transformation means, and a current sensor 33 are added. The fourth coordinate transformer 64 transforms winding current values iuf,ivf,iwf of the motor in three-phase UVW fixed coordinate system into winding current values iαf,iβf in the two-phase α-β fixed coordinate system. The fifth coordinate transformer 65 transforms current control signals vα,vβ in the two-phase α-β fixed coordinate system into current control signals iuf,ivf,iwf in three-phase UVW fixed coordinate system. The current sensor 33 detects the third phase winding current iwf Additionally, the current sensor 33 can be omitted, since the third phase winding current can be calculated from the outputs of the first and the second current sensors 31,32 taking the symmetric property into consideration. Composing elements other than those mentioned here are similar to those in the first embodiment. Accordingly, the detailed explanation is omitted.

In the first or the second embodiment of the stepping motor driver according to the present invention, the stepping motor driver is composed of a plurality of composing elements. Number of the composing elements can be reduced by using a microprocessor in which a certain number of functions of the composing elements are carried out.

In the stepping motor driver according to the present invention, the current value corresponding to the motor current amplitude is set on the dp-axis as the command current, whereas zero current value is set on the qp-axis as another command current value. As a result, the q-axis component of the current value appears due to the angle difference between the rotor angle and the command angle, and a torque is generated. Accordingly, an operation for controlling the q-axis current according to the rotor angle or the generated torque is not required.

Consequently, a stepping motor driver having a simple construction, low in price and having a micro step drive function with high degree of accuracy can be provided. That is, for example, such transformation operation in which command current values in sinusoidal wave forms are given on the α-β axes of the α-β fixed coordinate system and transformed into the d-q rotational coordinate system can be omitted, and the constitution can be simplified comparing with a conventional micro step driver.

Additionally, it is obvious that the stepping motor driver according to the present invention can be applicable to a multi-phase stepping motor other than two or three-phase stepping motor.

What is claimed is:

1. A stepping motor driver comprising:

current sensors that detect respective winding current values of corresponding phases of a stepping motor that is caused to make a stepping rotation at each time when an external command pulse is applied, an angle detection means that detects a rotor angle value indicative of a rotational angular position of a rotor, of said stepping motor, comprising a permanent magnet, a first coordinate transformation means that receives said winding current values from said current sensors, receives said rotor angle value from said angle detection means, and transforms said winding current values into winding current values in a rotational coordinate system, an angle calculation means that receives a command pulse train composed of said external command pulses and calculates a command angle value, a third coordinate transformation means that transforms command current values given from the outside into command current values in said rotational coordinate system according to the difference between said command angle value and said rotor angle value, a current control means that generates current control signals in said rotational coordinate system based on the differences between said command current values in said rotational coordinate system and said winding current values in said rotational coordinate system, a second coordinate transformation means that receives said current control signals in said rotational coordinate system from said current control means, receives said rotor angle value from said angle detection means, and transforms said current control signals in said rotational coordinate system into current control signals in a fixed coordinate system, and a current supply means that receives said current control signals in said fixed coordinate system from said second coordinate transformation means, and supplies currents to windings of respective phases of said stepping motor wherein;

said stepping motor is a two-phase stepping motor, said first coordinate transformation means transforms said winding current values in a two-phase fixed coordinate system into winding current values in a two-phase rotational coordinate system, said second coordinate transformation means transforms said current control signals in said two-phase rotational coordinate system into said current control signals in said two-phase fixed coordinate system, an axis of said two-phase rotational coordinate system is in a direction of a magnetic flux of said rotor, and another axis of said two-phase rotational coordinate system is in a direction perpendicular to said direction of said magnetic flux of said rotor, and a component of said command current value in the direction of said command angle is set to be a value corresponding to an amplitude of said command current value given from the outside into said third coordinate transformation means, and another component of said command current value in the direction perpendicular to said command angle is set to be zero.

2. A stepping motor driver comprising:

current sensors that detect respective winding current values of corresponding phases of a stepping motor that is caused to make a stepping rotation at each time when an external command pulse is applied, an angle detection means that detects a rotor angle value indicative of a rotational angular position of a rotor, of said stepping motor, comprising a permanent magnet, a first coordinate transformation means that receives said winding current values from said current sensors, receives said rotor angle value from said angle detection means, and transforms said winding current values into winding current values in a rotational coordinate system, an angle calculation means that receives a command pulse train composed of said external command pulses and calculates a command angle value, a third coordinate transformation means that transforms command current values given from the outside into command current values in said rotational coordinate system according to the difference between said command angle value and said rotor angle value, a current control means that generates current control signals in said rotational coordinate system based on the differences between said command current values in said rotational coordinate system and said winding current values in said rotational coordinate system, a second coordinate transformation means that receives said current control signals in said rotational coordinate system from said current control means, receives said rotor angle value from said angle detection means, and transforms said current control signals in said rotational coordinate system into current control signals in a fixed coordinate system, and a current supply means that receives said current control signals in said fixed coordinate system from said second coordinate transformation means, and supplies currents to windings of respective phases of said stepping motor wherein;

said stepping motor is a three-phase stepping motor, a forth coordinate transformation means is provided between said current sensors and said first coordinate transformation means, said forth coordinate transformation means transforms winding current values in a three-phase fixed coordinate system into winding current values in a two-phase fixed coordinate system, said first coordinate transformation means transforms said winding current values in said two-phase fixed coordinate system into winding current values in a two-phase rotational coordinate system, said second coordinate transformation means transforms said current control signals in said two-phase rotational coordinate system into said current control signals in said two-phase fixed coordinate system, an axis of said two-phase rotational coordinate system is in a direction of a magnetic flux of said rotor, and another axis of said two-phase rotational coordinate system is in a direction perpendicular to said direction of said magnetic flux of said rotor, a component of said command current value in the direction of said command angle is set to be a value corresponding to an amplitude of said command current value given from the outside into said third coordinate transformation means, and another component of said command current value in the direction perpendicular to said command angle is set to be zero, a fifth coordinate transformation means is provided between said second coordinate transformation means and said current supply means, and said fifth coordinate transformation means transforms said current control signals in said two-phase fixed coordinate system into current control signals in three-phase fixed coordinate system.

* * * * *